United States Patent [19]
Vanyi

[11] 3,917,147
[45] Nov. 4, 1975

[54] SOLDER TIP CLEANING APPARATUS
[76] Inventor: Louis Vanyi, 246 Crestwood Ave., Ventura, Calif. 93003
[22] Filed: Apr. 2, 1974
[21] Appl. No.: 457,284

[52] U.S. Cl. .................................. 228/19; 228/53
[51] Int. Cl.² .......................................... B23K 3/02
[58] Field of Search ........................ 228/19, 20, 53

[56] References Cited
UNITED STATES PATENTS

| | | | |
|---|---|---|---|
| 2,780,712 | 2/1957 | Thomas | 228/53 |
| 3,172,382 | 3/1965 | Weglin | 228/20 |
| 3,316,384 | 4/1967 | Daniels | 228/19 X |
| 3,575,336 | 4/1971 | Booth | 228/53 |
| 3,580,462 | 5/1971 | Vanyi | 228/53 X |

Primary Examiner—Al Lawrence Smith
Assistant Examiner—K. J. Ramsey
Attorney, Agent, or Firm—Richard S. Sciascia; Joseph M. St.Amand; David O'Reilly

[57] ABSTRACT

Apparatus and method for cleaning soldering irons in which a soldering tip of the type having capillary passages is provided with a tiny passageway through the wall of the tip into the upper portion of the capillary passages through which solder and other debris can be expelled from the tip by vapor pressure. Solder collected by capillary action in a cavity in the tip is expelled through the tubular passageway communicating with the capillary passageways when the working end of the soldering tip is pressed lightly on a moistened sponge. The sponge is mounted in a receptacle which has first and second reservoirs containing water and high temperature oil, respectively. The sponge is kept moist by a wick which extends down into the water. The reservoir containing the high temperature oil has a small access hole which supports a soldering iron with the tip substantially submerged in the oil when not in use. The receptacle also has a removable hood constructed to capture the expelled solder for later recovery and reuse.

4 Claims, 8 Drawing Figures

Fig. 6.
Fig. 7.
Fig. 8.
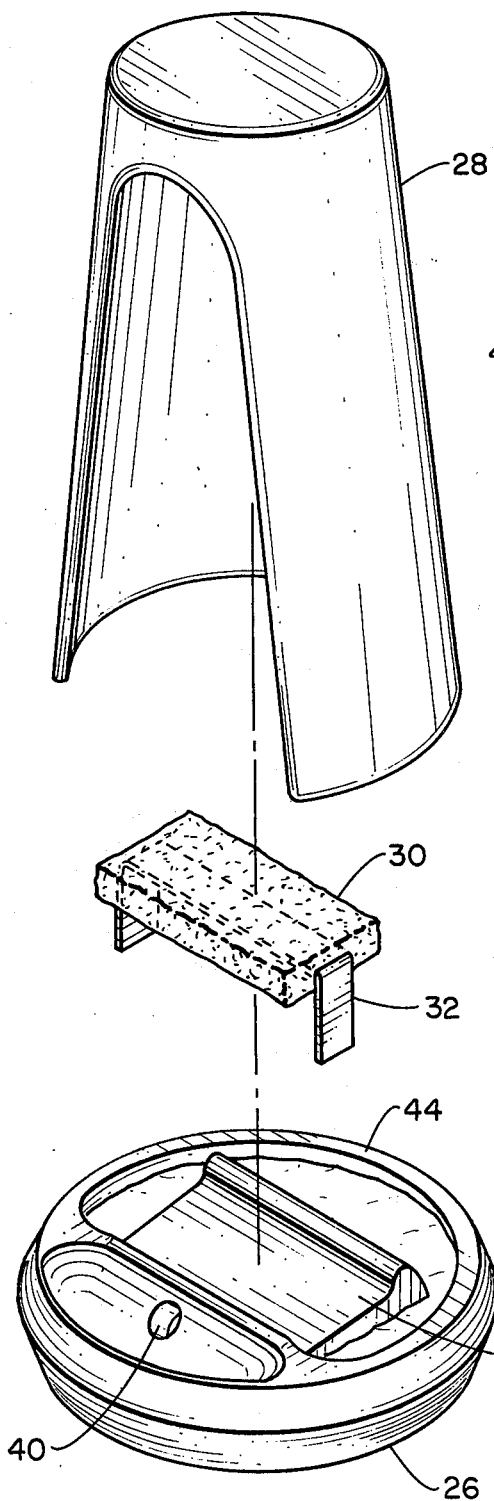
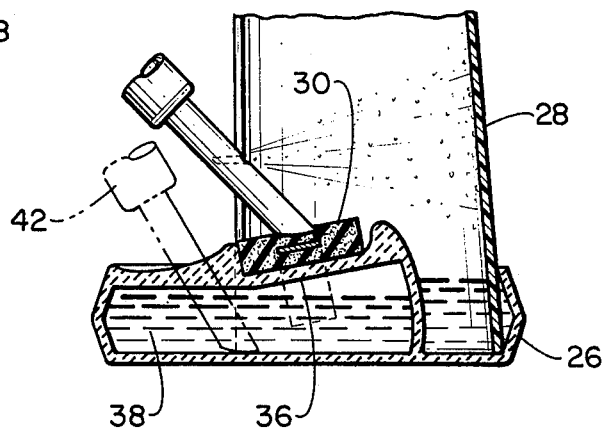
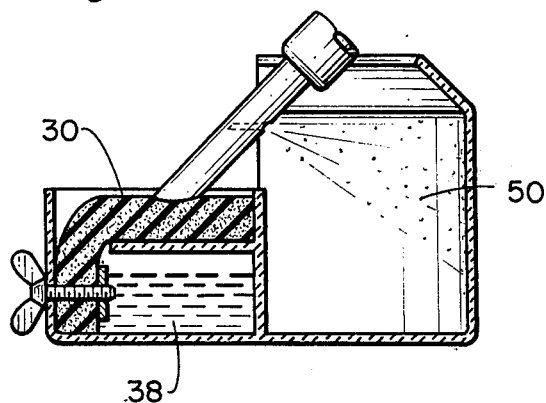

SOLDER TIP CLEANING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to soldering techniques, methods and apparatus therefor, and more particularly relates to methods and apparatus for cleaning soldering iron tips. With the advent of printed circuit technology, many new tools have become available to the solder operator. These include new type soldering tips as well as accessories for use with soldering irons. One such invention uses capillary action to store solder removed from components or to store solder for soldering operations.

Soldering tips are usually cleaned by wiping or shaking to dislodge excess solder. Usually a technician will shake the soldering iron into a waste paper basket, which is messy and results in a waste of solder. Shaking is also time-consuming and inefficient because all of the debris and solder collected on or in the tip is difficult to dislodge. The present invention solves these problems by providing a quick and easy method and apparatus for completely cleaning the tip of solder and debris and also provides a receptacle for efficient use with soldering irons.

SUMMARY OF THE INVENTION

The purpose of the present invention is to provide techniques and apparatus for quickly and efficiently cleaning soldering iron tips, and especially those tips which use capillary action to store solder. This invention is an improvement of the soldering iron tips shown in U.S. Pat. No. 3,580,462, filed Dec. 14, 1967. The soldering tips shown in that patent are not as efficient as they could be because it was difficult to dislodge all the solder and debris stored in the tip by the shaking operation described above. The soldering tips of this invention are provided with a small tubular passageway communicating with the interior ends of the capillary passageways through which solder and other debris can be expelled by vapor pressure. For this purpose, a receptacle is provided having a moistened sponge on which the working end of the soldering tip can be lightly pressed, thus creating pressure to expel solder and debris out through the tubular passageway. The receptacle also contains a substantially enclosed reservoir having a high temperature oil. An access hole to the oil reservoir supports a soldering iron so that the tip is immersed in the oil. The purpose of the high temperature oil is to drain out excess heat from the soldering tip. It will also lubricate the internal capillary passages of the tip and prevent accumulation of carbonized flux and other impurities and provides for a convenient method to purge such wastes into the receptacle where it accumulates for recycling in a solder pot. The oil bath, by cooling and lubricating the tip, also acts as an oxidation retardant, thereby increasing the life of soldering tips.

OBJECTS OF THE INVENTION

It is an object of the present invention to provide a method and apparatus for quickly and efficiently cleaning soldering iron tips.

It is another object of the present invention to provide an apparatus for purging solder and debris from soldering tips which store solder by capillary action.

Another object of the present invention is to provide a receptacle for use with soldering irons for cleaning the soldering iron tips.

Another object of the present invention is to provide a receptacle for use with a soldering iron which has an oil bath for cooling the soldering iron tip.

Yet another object of the present invention is to provide a receptacle for use with a soldering iron which has an oil bath for lubricating a soldering iron tip.

Still another object of the present invention is to provide a receptacle for use with a soldering iron which has an oil bath to act as an oxidation retardant.

Other objects, advantages and novel features of the present invention will become apparent from the following detailed description of the invention when considered in conjunction with the accompanying drawings.

BRIEF DESCRIPTION OF THE DRAWINGS

FIG. 6 is an exploded view of a soldering iron holder and cleaning receptacle for use with soldering irons.

FIG. 7 demonstrates the operation of the soldering iron tip of FIG. 1 with the receptacle of FIG. 6.

FIG. 8 illustrates the operation of the soldering iron tip of FIG. 3 and a receptacle for use therewith.

DETAILED DESCRIPTION OF THE PREFERRED EMBODIMENT

Figure 1:
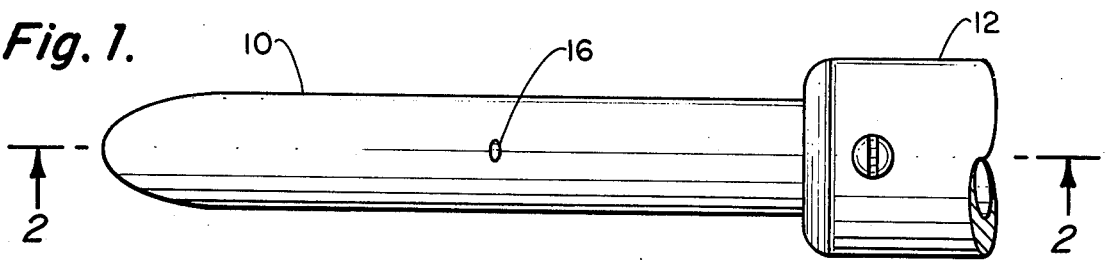
FIG. 1 is a top elevation of the soldering iron tip of the present invention.

Referring now to FIG. 1, a soldering tip 10 is shown attached to a chuck assembly 12 of a standard soldering iron. The soldering tip 10 may be any of the types shown in U.S. Pat. No. 3,580,462, referred to above. The soldering tips shown in that patent have a plurality of passageways in the tip which draw solder into the tip by capillary action. In order to clean the solder out of these tips, it was necessary to shake them over a waste basket, which was both messy and inefficient. Efforts to improve and simplify the cleaning of the capillary soldering tip led to the discovery that a small port 16 communicating with the interior ends of the capillary passageways permitted easy purging, or expelling, of solder and debris from the tip by vapor pressure.

Figure 2:
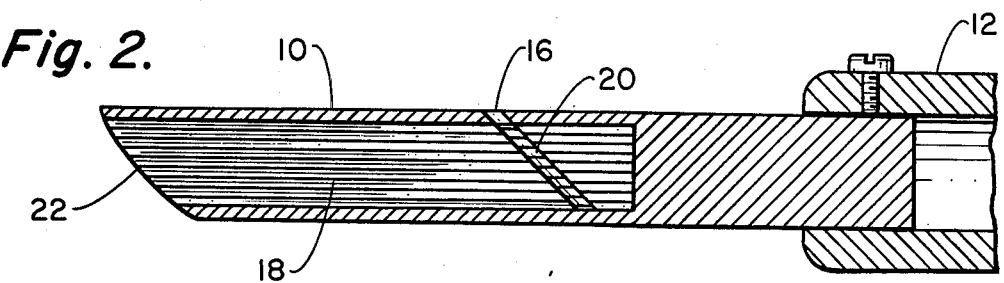
FIG. 2 is a sectional side elevation of the soldering iron tip of FIG. 1.

The internal passageway for cleaning the soldering tip is shown more clearly in FIG. 2. The soldering tip 10 has a bundle of rods 18 assembled to provide a plurality of elongate internal capillary passageways. The port 16 is coterminous with an inclined passageway 20 bored through the bundle of rods to the opposite wall of the soldering tip 10. The internal passageway 20 is in communication with the elongate internal capillary passageways. Thus, when the working end 22 of the soldering tip 10 is pressed on a moistened sponge, vapor pressure forces solder and debris up through the capillary passageways and out internal inclined passageway 20 and port 16. The inclined passageway 20 forces the expelled solder downward toward the forward or working end 22 of the soldering tip 10. The port 16 can vary from approximately 1/32 to 3/64 of an inch without seriously impairing its operation. The internal passageway 20 is inclined approximately 45°.

Figure 3:
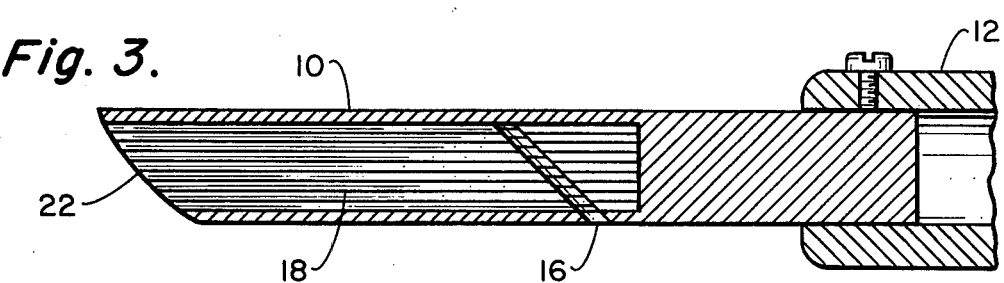
FIG. 3 is a sectional side elevation of the soldering iron tip of FIG. 1 having a variation in construction.

In the embodiment shown in FIG. 3, the soldering tip 10 is generally the same. However, the port 16 is provided in the rear wall of the soldering tip 10. In this case, solder and debris will be expelled rearwardly away from the working end 22 of the soldering tip 10.

Figure 4:
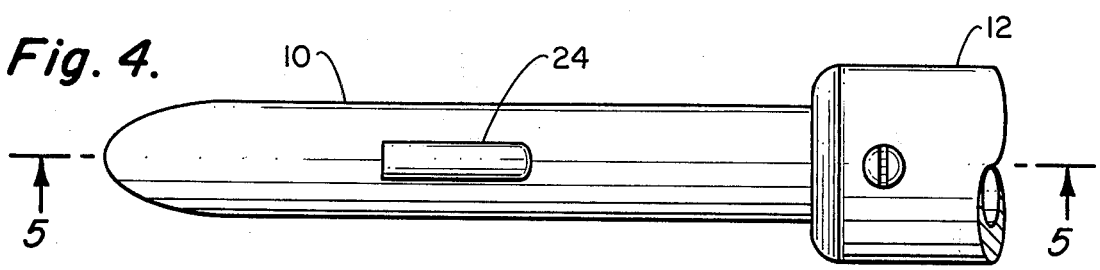
FIG. 4 is a top view of a soldering iron tip of the present invention including a tube for directing expelled solder downward.
Figure 5:
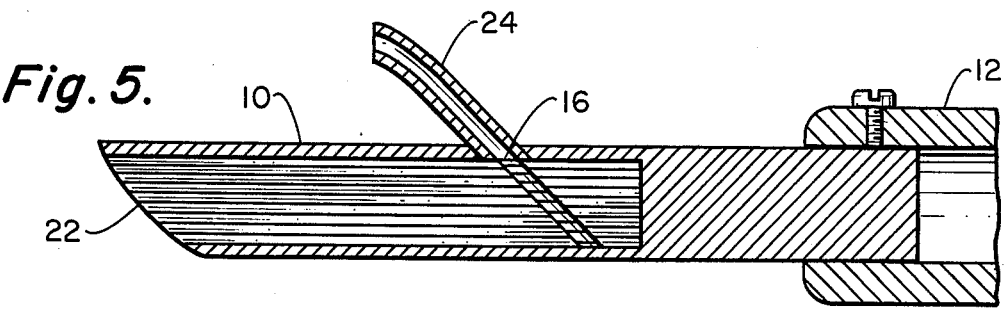
FIG. 5 is a side elevation of the soldering iron tip of FIG. 4.

Another variation of the embodiment of FIG. 2 is shown in FIGS. 4 and 5. In this case, the port 16 is provided with a tube 24 in order to assure that the solder expelled from the tip will be directed downward into a receptacle. Of course, the tube 24 could also be added to the embodiment shown in FIG. 3, if desired.

A receptacle for use in cleaning soldering iron tips is shown in FIG. 6 and is particularly suitable for use with the capillary tips of this invention. The receptacle is comprised of a base 26, a hood 28, and a sponge 30, which is kept moist by a wick 32 in contact with water. The base 26 has an open reservoir 34 which contains water for keeping the sponge 30 moist. A platform 36 is provided, which rises above the water reservoir 34, on which the sponge 30 is supported. For convenience, the platform 36 is slightly inclined, as shown in FIG. 7. When the sponge 30 is supported on the platform 36, the wick 32 extends down into the water in reservoir 34. As long as the water level in reservoir 34 is kept high enough to contact wick 32, the sponge 30 will be kept moist.

The base 26 also has a closed reservoir 38 (FIG. 7) filled with a high temperature oil to provide a bath for the soldering tip. The base 26 has an access hole 40 to reservoir 38 for supporting a soldering iron tip when the soldering iron is not in use. The hot tip of a soldering iron is lowered through the access hole 40 into a shallow bath of high temperature oil (peanut oil or such), as shown at 42 in FIG. 7, which makes direct contact with the tip and completely surrounds it. This protects the tip from oxidation, lubricates the internal capillary passageways and also distributes and stabilizes its temperature. No other heat control is necessary; the iron is always ready for use by the solder operator. If desired, the access hole 40 can be made large enough to accommodate the chuck assembly 12 (FIG. 1) of the soldering iron so that the soldering tip will be almost completely immersed in the high temperature oil. In this case, of course, the reservoir 38, shown in FIG. 7, would be considerably deeper.

Hood 28 is provided to collect solder expelled from the soldering tip into the receptacle. The hood is made so that it rests either on the rim 44 of base 26 or can fit inside the rim, as shown in FIG. 7. Thus, the hood 28 can be lifted off from time to time to reclaim the solder collected in the receptacle for recycling in a solder pot. The base 26 and hood 28 are made out of ceramic, metal or high temperature plastic, with the base 26 sealed on all sides and oil bath 38 serviceable through a snap plug (not shown) in the bottom if desired. The sponge 30 and wick 32 should be made of a highly water-absorbent material. Instead of a wick 32, the sponge itself could extend over the side of the platform into the water in a manner shown in FIG. 8.

The manner in which solder and debris is purged from the soldering tips of FIGS. 1 to 5 is illustrated in FIGS. 7 and 8. The receptacle shown in FIG. 6 is more suitable for the embodiment where the solder is expelled toward the forward end of the soldering tip. This operation is shown in FIG. 7. To dislodge solder from a soldering tip heated to a working temperature, all that is necessary is to quickly and firmly press the working end 22 (FIG. 1) of the soldering tip on the moistened sponge 30. The heat from the soldering tip causes the moisture in the sponge 30 to vaporize, creating a pressure in the capillary passages of the tip, thus forcing solder and debris out through the port. It is best to purge a loaded soldering tip before each soldering operation just as it is lifted from the oil bath.

FIG. 8 shows a modified receptacle for use when purging the embodiment of FIG. 3 of solder. In this case, the soldering tip is pressed firmly on sponge 30, extending into a water reservoir 38 and solder is expelled away from the forward end of the tip into a collecting chamber 50 for recycling.

Thus, there has been disclosed a novel technique and apparatus for cleaning soldering tips and which is especially suitable for use with the soldering tips which store solder by capillaray action. Many variations of the present invention are possible. For example, the soldering tip shown in FIGS. 1 to 5 could have two or three adjacent ports, if desired. The receptacle shown in FIG. 6 is also suitable for use with standard soldering tips. In this case, excess solder on the tip would merely be dislodged into the water reservoir by shaking in the conventional manner and the tip wiped clean on the moistened sponge.

Obviously, many modifications and variations of the present invention are possible in light of the above teachings. It is therefore to be understood that within the scope of the appended claims the invention may be practiced otherwise than as specifically described.

I claim:

1. In a hand tool useful in performing soldering and desoldering operations, said tool having a removable heatable tip having at least one capillary passage extending away from the working end of the tip toward the interior end of the tip, the improvement which comprises:

a. at least one passageway passing through the outer wall of the tip communicating with the interior end of the at least one capillary passage so that accumulated solder and debris will be purged from said at least one capillary passage and expelled from the passageway by vapor pressure when the heated working end of the solder tip is pressed down on a moistened sponge means;

b. said at least one passageway which passes through the outer wall of the tip terminating in a tube attached to the soldering tip for directing expelled materials into a receptacle.

2. The hand tool according to claim 1 wherein the passageway communicating with the capillary passageway is inclined downward toward the working end of the solder tip so that solder dislodged from the tip will be directed toward said receptacle.

3. The hand tool according to claim 2 wherein the passageway is inclined forwardly so that materials expelled therefrom are directed toward the forward area of the soldering tip.

4. The hand tool according to claim 2 wherein the passageway is inclined toward the rear so that materials expelled therefrom are directed away from the forward area of the tip.

* * * * *